(12) United States Patent
Kim et al.

(10) Patent No.: US 7,767,614 B2
(45) Date of Patent: Aug. 3, 2010

(54) METHOD FOR PREPARATION OF SPHERICAL SUPPORT FOR OLEFIN POLYMERIZATION CATALYST

(75) Inventors: Eun-Il Kim, Daejeon (KR); Young-Joo Lee, Inchon (KR); Hoe-Chul Jung, Chungcheongnam (KR); Joon-Ryeo Park, Seoul (KR)

(73) Assignee: Samsung Total Petrochemicals Co., Ltd., Seosan-shi, Chungcheongnam Province (KR)

( * ) Notice: Subject to any disclaimer, the term of this patent is extended or adjusted under 35 U.S.C. 154(b) by 811 days.

(21) Appl. No.: 11/614,390

(22) Filed: Dec. 21, 2006

(65) Prior Publication Data

US 2008/0064589 A1    Mar. 13, 2008

(30) Foreign Application Priority Data

Aug. 30, 2006    (KR)    ...................... 10-2006-0082595

(51) Int. Cl.
*B01J 31/00*    (2006.01)
*C08F 10/00*    (2006.01)

(52) U.S. Cl. ..................................... 502/150
(58) Field of Classification Search .................. 502/150
See application file for complete search history.

(56) References Cited

U.S. PATENT DOCUMENTS

| 4,032,348 | A | * | 6/1977 | Kido et al. ..................... 430/1 |
| 5,162,277 | A | | 11/1992 | Job |
| 5,955,396 | A | | 9/1999 | Lee et al. |

FOREIGN PATENT DOCUMENTS

| EP | 1108730 | * | 6/2001 |
| JP | 4287104 | | 10/1992 |
| JP | 4368391 | | 12/1992 |
| JP | 7274429 | | 10/1995 |
| JP | 9263665 | | 10/1997 |

* cited by examiner

*Primary Examiner*—Melvin C Mayes
*Assistant Examiner*—Yun Qian
(74) *Attorney, Agent, or Firm*—Barlow, Josephs & Holmes, Ltd.

(57) ABSTRACT

Provided is a method for preparing a support for olefin polymerization catalysts used in polyolefin preparation processes. Particularly, provided is a novel method for preparing a support for olefin polymerization catalysts comprising the reaction of metal magnesium with an alcohol in the presence of an additive for initiating the reaction, characterized in that halogenated nitrogen compound is used as the additive for initiating the reaction, resulting in a spherical dialkoxy magnesium support.

2 Claims, 1 Drawing Sheet

METHOD FOR PREPARATION OF SPHERICAL SUPPORT FOR OLEFIN POLYMERIZATION CATALYST

FIELD OF THE INVENTION

The present invention relates to a method for preparing a spherical support for olefin polymerization catalysts, specifically to a method for preparing a spherical support for olefin polymerization catalysts, which has a smooth surface and a uniform particle size distribution by reacting metal magnesium with an alcohol in the presence of halogenated nitrogen compound.

BACKGROUND OF THE INVENTION

Currently, the most widely used catalyst for olefin polymerization is a magnesium chloride-supported Zeigler-Natta catalyst. The magnesium chloride-supported Zeigler-Natta catalyst is a solid catalyst component generally comprised of magnesium, titanium, halogen and an electron-donating organic compound. When it is used in polymerization of alpha-olefins such as propylene, it can be used together with an organic aluminum compound as a co-catalyst and an organic silane as a stereoregularity control agent at an appropriate mixing ratio. Since such supported type solid catalysts for olefin polymerization are applied to various commercial processes such as slurry polymerization, bulk polymerization, gas phase polymerization and the like, they need to meet the requirements regarding particle morphology including an appropriate particle size, uniformity in particle distribution, minimized amount of fine particles, high bulk density and the like, as well as basic requirements including high catalyst activity and stereoregularity.

As a method for improving the particle morphology of a support for olefin polymerization catalysts, those using recrystallization and reprecipitation, spray drying, and chemical reactions have been currently known in the art Among them, one of the methods using chemical reactions, which uses dialkoxy magnesium as a support for catalyst preparation, obtained by reacting magnesium with an alcohol, has been attracting more attention, since the method provides a catalyst having much higher activity than those obtained from other methods, and polymers having high stereoregularity.

When using dialkoxy magnesium as a support, the particle shape, particle size distribution, bulk density and the like of the dialkoxy magnesium directly affect the catalyst and the particle properties of the resulted polymers. Therefore, it is demanded to develop a highly uniform and spherical dialkoxy magnesium support having sufficiently high bulk density through the reaction between magnesium and an alcohol.

Various methods for preparing dialkoxy magnesium having a uniform shape have been disclosed in literatures from prior arts. U.S. Pat. Nos. 5,162,277 and 5,955,396 suggest a method for preparing a support having a size of 51-10 µm, by carboxylating amorphous diethoxy magnesium with carbon dioxide to produce magnesium ethyl carbonate and recrystallizing the magnesium ethyl carbonate in a solution with various additives and a solvent. Further, Japanese laid-open patent application No. Heisei 06-87773 discloses a method for producing spherical particles by spray-drying an alcoholic solution of diethoxy magnesium carboxylated with $CO_2$, and decarboxylating the resulted product. However, such conventional methods requires complex processes involving many kinds of raw materials, and can provide neither agreeable particle size nor shape of the resulted support.

In Japanese laid-open patent application Nos. Heisei 03-74341, Heisei 04-368391 and Heisei 08-73388, provided are methods for preparing diethoxy magnesium in spherical or elliptical shape by reacting metal magnesium with ethanol in the presence of iodine However, since said method involves an extremely rapid reaction which generates great reaction heat together with lots of hydrogen during the reaction process, it is difficult to adjust the reaction rate to the desired level. Further, there is another problem that the resulted diethoxy magnesium support comprises lots of fine particles or mass particles having different shape which are resulted from agglomeration of several particles. Therefore, if a catalyst prepared from such support is used, as it is, for olefin polymerization, it would cause problems such that the particle size of the resulted polymer become excessively large, or an operational failure would occur owing to the collapse of particle shapes by polymerization heat during the polymerization process.

The mainly used initiators for the above said preparation of dialkoxy magnesium support, include for example iodine which is a halogen; dibromoethane which is an organic halogen compound; and magnesium chloride, magnesium bromide and magnesium iodide which are metal halogen compounds.

The halogenated nitrogen compound, which has been used as an initiator for the first time by the present invention, has been reported in Tetrahedron vol. 59, p. 6739; Catalysis Communications vol. 7 p. 399; Tetrahedron Letters vol. 46, p. 5293 for its use in alcohol oxidation, acylation, alcohol protecting reaction, halogenation and the like. However, its use in the preparation of dialkoxy magnesium support has not been reported yet.

SUMMARY OF THE INVENTION

The object of the present invention which has been designed to solve the foregoing problems of the prior arts, is to provide a method for preparing a spherical support for olefin polymerization catalysts, wherein the support has a spherical particle shape with the even and smooth surface and uniform particle size distribution so as to be suitably used in the preparation of a catalyst which sufficiently meets the particle properties required in commercial olefin polymerization Processes such as slurry polymerization, bulk polymerization, gas phase polymerization and the like.

DETAILED DESCRIPTION OF THE INVENTION

Figure 1:
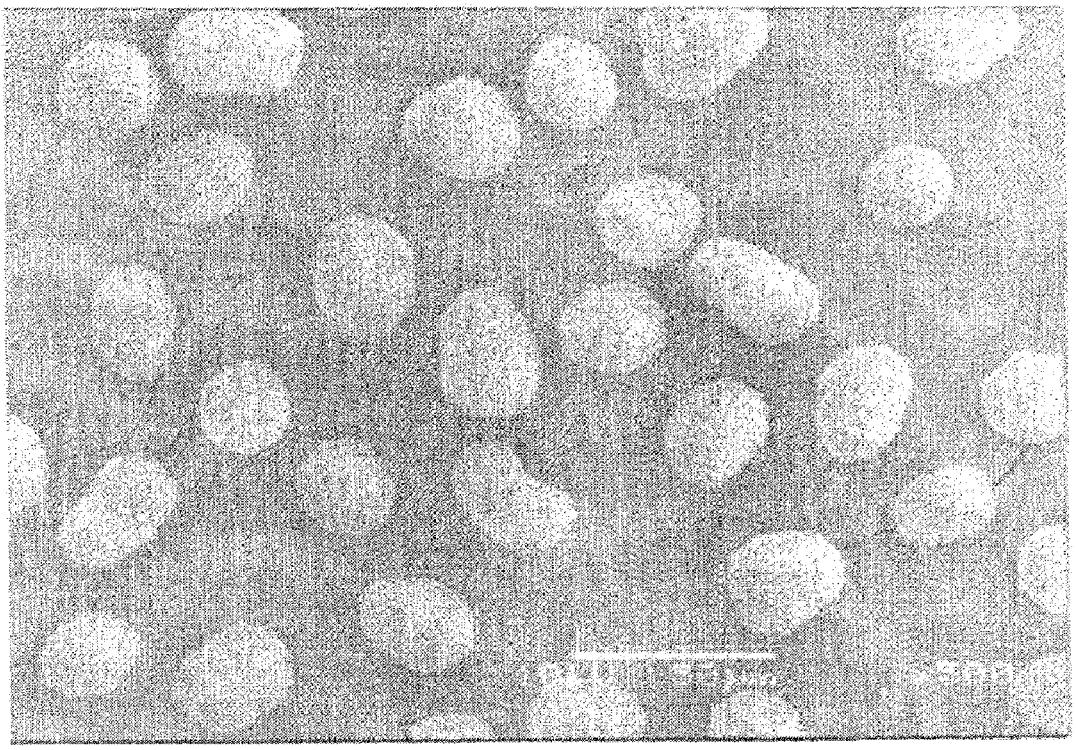
FIG. 1 is an electron microscopic photograph of a support obtained from Example 1 of the present invention.

The method for preparing a spherical support for olefin polymerization according to the present invention comprises reacting metal magnesium with an alcohol in the presence of a halogenated nitrogen compound as a reaction initiator, wherein the halogenated nitrogen compound is at the amount of 0.001-0.2 parts by weight, based on 1 part by weight of the metal magnesium, and the alcohol is used at the amount of 5-50 parts by weight, based on 1 part by weight of the metal magnesium.

The shape of the metal magnesium used in the preparation method of a support according to the present invention is not strictly limited. However, regarding the size, it is a powder preferably having an average particle diameter of 10-300 μm and more preferably having average particle diameter of 50-200 μm, When the average particle diameter of the metal magnesium is less than 10 μm, the average particle diameter of the resulted support becomes too small However, when it is more than 300 μm, the average particle size of the resulted support becomes too large and then it would be difficult to obtain a uniform spherical shape in the resulted support.

The halogenated nitrogen compound that is used as a reaction initiator in the preparation method of a support according to the present invention is one of the compounds represented by the following formula I to IV.

(1) N-Halide Succinimides

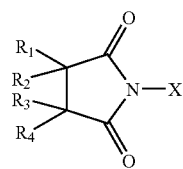

I

Wherein, X refers to halogen, and $R_1$, $R_2$, $R_3$ and $R_4$ are independently hydrogen, or alkyl or aryl having $C_{1-12}$.

(2) Trihaloisocyanuric Acids

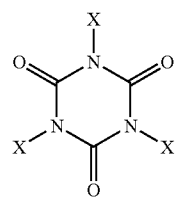

II

Wherein, X refers to halogen.

(3) N-Halophthalimides

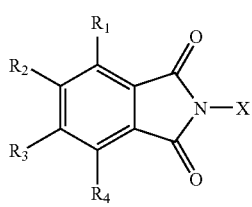

III

Wherein, X refers to halogen, and $R_1$, $R_2$, $R_3$ and $R_4$ are independently hydrogen, or alkyl or aryl having $C_{11-12}$.

(4) Hydantoins

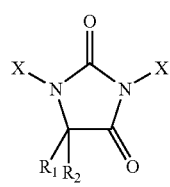

IV

Wherein, X refers to halogen, and $R_1$ and $R_2$ are independently hydrogen, or alkyl or aryl having $C_{1-12}$.

In the preparation method of a support according to the present invention, the halogenated nitrogen compound is preferably used at the amount of 0.001-0.2 parts by weight, based on 1 part by weight of the metal magnesium. When the amount is less than 0.001 parts by weight, the reaction rate will become so slow, and when it exceeds 0.2 parts by weight, the particle size of the resulted product will get too big, or a large amount of fine particles may be generated.

As for the alcohol used in the preparation method according to the present invention, at least one selected from the group consisting of aliphatic alcohols represented by general formula ROH (wherein, R is an alkyl having 1-6 carbon atoms) such as methanol, ethanol, n-propanol, isopropanol, n-butanol, isobutanol, n-pentanol, isopentanol, neopentanol, cyclopentanol, cyclohexanol or the like, and aromatic alcohols such as phenol can be preferably used alone or in the form of a mixture; more preferably, at least one selected from the group consisting of methanol, ethanol, propanol and butanol can be used alone or in the form of a mixture; and the most preferably, ethanol is used.

The ratio of the metal magnesium to the alcohol being used in the method for preparing a support according to the present invention, is preferably 1:5-1:50 by weight, and more preferably 1:7-1:20. When the ratio is less than 1:5, viscosity of the resulted slurry becomes so rapidly increased that homogeneous mixing can not be achieved. However, when it is more than 1:50, bulk density of the resulted support becomes rapidly decreased or the particle surface becomes rough.

According to the present invention, the reaction of metal magnesium with an alcohol in the presence of the halogenated nitrogen compound is carried out preferably in the temperature range of 60-110° C., and more preferably in the range of 70-90° C. It is also possible to practice the reaction at the boiling point of the alcohol under reflux. When the reaction temperature is less than 60° C., the reaction becomes too slow. However, when it is more than 110° C., the reaction becomes so rapidly conducted that the amount of fine particles is dramatically increased, and particles become agglomerated, thereby being impossible to obtain a uniform spherical support with desired particle size.

Hereinafter, the present invention is further described in detail referencing the following examples and comparative example. However, the present invention is by no means restricted by those examples.

EXAMPLES

Example 1

After sufficiently substituting the atmosphere in a ceramic reactor having 5 L volume, which is equipped with a stirrer, an oil heater and a reflux condenser, with nitrogen, the reactor was charged with 1.65 g of N-chloro succinimide, 15 g of metal magnesium which is a powdered product having an average particle diameter of 100 μm and 240 ml of ethanol anhydride, and continued the reflux of ethanol at the agitation speed of 240 rpm, while elevating the temperature of the reactor to 78° C. After a lapse of 5 minutes, hydrogen started to be generated as the reaction starts. Therefore, the exit of the reactor should remain open to let the generated hydrogen out of the reactor and thus to maintain the atmospheric pressure inside the reactor. With completion of the hydrogen generation, 15 g of metal magnesium which is a powdered product having an average particle diameter of 100 μm and 240 ml of ethanol in total were added to the reactor three times every 20 minutes. Completing the addition of the metal magnesium and ethanol, the temperature and the agitation speed of the reactor were maintained under reflux for two hours (for aging). After the aging, the resulted product was washed three times with 2000 ml of n-hexane each time at 50° C. The washed resulted product was dried under nitrogen stream for 24 hours. Obtained was 270 g of a white solid in powder form with good flowability (a support, yield 96%).

The particle shape of the dried resulted product was observed with an electron microscope, and the bulk density was determined Further, the particle sizes of the dried resulted product suspended in n-hexane were measured by using a laser particle size analyzer (Mastersizer X:Malvern Instrument) through a light transmission method, thus obtaining a cumulative particle size distribution. Based on the resulted distribution data, the average particle diameter and particle size distribution index were determined as below.

① Average particle diameter ($D_{50}$) particle size corresponding to 50% of the cumulative weight ② Particle size distribution index (P): $P=(D_{90}-D_{10})/D_{50}$ (wherein, $D_{90}$ is the particle size corresponding to 90% of the cumulative weight, $D_{10}$ is the particle size corresponding to 10% of the cumulative weight.)

The observations, measurements and determinations as described above are represented in Table 1 and FIG. 1.

Example 2

The method as in Example 1 was carried out, except that 2.2 g of chlorophthalimide was used instead of 1.65 g of N-chlorosuccinimide as a reaction initiator, and as a result, 267 g of a white solid powder (yield 94.5%) with good flowability was obtained.

The bulk density was measured, and the average particle diameter and particle size distribution index were determined in the same manner of Example 1. The results are represented in Table 1 below.

Example 3

The method as in Example 1 was carried out, except that 2.2 g of N-bromosuccimide was used instead of 1.65 g of N-chlorosuccinimide as a reaction initiator, and as a result, 272 g of a white solid powder (yield 96.3%) with good flowability was obtained.

The bulk density was measured, and the average particle diameter and particle size distribution index were determined in the same manner of Example 1. The results are represented in Table 1 below.

Example 4

The method as in Example 1 was carried out, except that 0.96 g of trichloroisocyanuric acid was used instead of 1.65 g of N-chlorosuccinimide as a reaction initiator, and as a result, 275 g of a white solid powder (yield 97.4%) with good flowability was obtained.

The bulk density was measured, and the average particle diameter and particle size distribution index were determined in the same manner of Example 1. The results are represented in Table 1 below.

Example 5

The method as in Example 1 was carried out, except that 3.5 g of 1,3-dibromo-5,5-dimethylhydantoin was used instead of 1.65 g of N-chlorosuccinimide as a reaction initiator, and as a result, 269 g of a white solid powder (yield 95.3%) with good flowability was obtained.

The bulk density was measured, and the average particle diameter and particle size distribution were determined in the same manner of Example 1. The results are represented in Table 1 below.

Comparative Example

After sufficiently substituting the atmosphere in a ceramic reactor having 5 L volume, which is equipped with a stirrer, an oil heater and a reflux condenser, with nitrogen, the reactor was charged with 3 g of iodine, 15 g of metal magnesium which is a powdered product having an average particle diameter of 100 μm and 240 ml of ethanol anhydride, and continued the reflux of ethanol at the agitation speed of 240 rpm, while elevating the temperature of the reactor to 78° C. Next, 15 g of metal magnesium which is a powdered product having an average particle diameter of 100 μm and 240 ml of ethanol in total were added to the reactor three times every 20 minutes. Completing the addition of the metal magnesium, the ethanol reflux conditions at the same agitation speed were maintained for two hours (aging) After the aging process, the resulted product was washed three times with 2000 ml of n-hexane each time at 50° C. The washed resulted product was dried under nitrogen stream for 24 hours. Obtained was 270 g of a white solid in powder form (yield 96%).

The particle shape of the resulted product was observed; the bulk density was measured; and the average particle diameter and particle size distribution were determined in the same manner of Example 1. The results are represented in Table 1 and FIG. 2 below.

TABLE 1

|  | Particle shape | Bulk density (g/cc) | Average particle diameter ($D_{50}$, μm) | Particle size distribution index |
|---|---|---|---|---|
| Example 1 | Sphere | 0.32 | 37 | 0.78 |
| Example 2 | Sphere | 0.33 | 28 | 0.75 |
| Example 3 | Sphere | 0.31 | 32 | 0.77 |
| Example 4 | Sphere | 0.30 | 31 | 0.83 |
| Example 5 | Sphere | 0.32 | 35 | 0.88 |
| Comp. example | Sphere | 0.30 | 45 | 1.21 |

INDUSTRIAL APPLICABILITY

Figure 2:
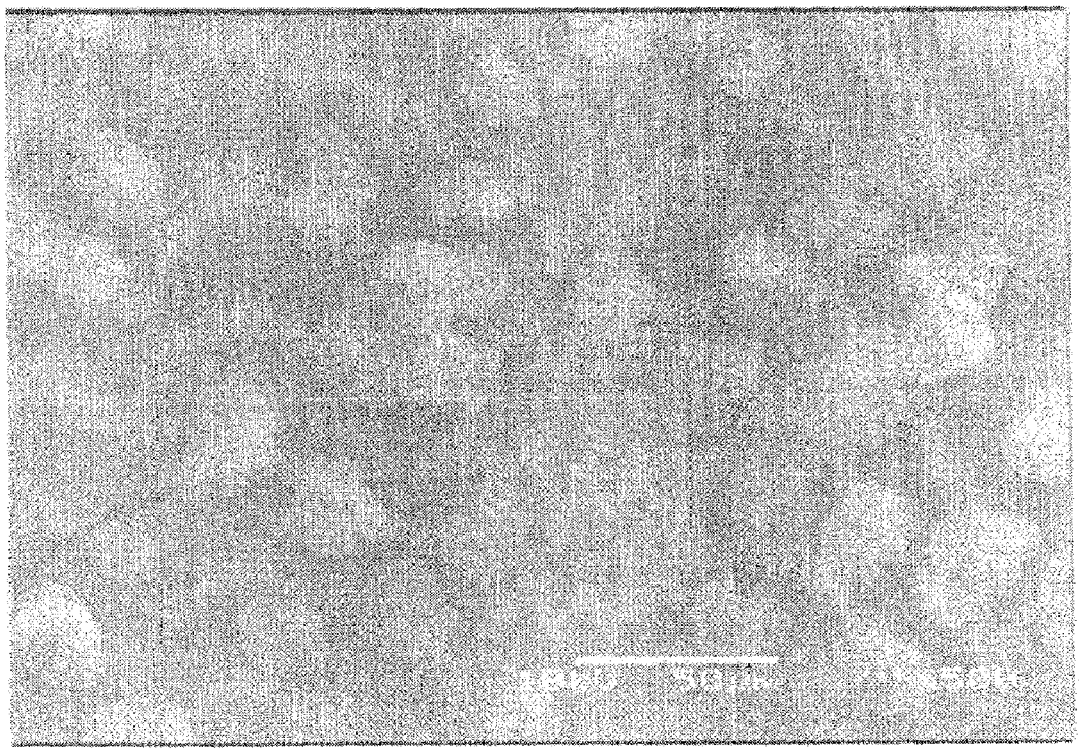
FIG. 2 is an electron microscopic photograph of a support obtained from Comparative example 1 of the present invention.

As shown in FIGS. 1 and 2, the shape of the support prepared with the reaction initiator according to the present invention has much smooth and uniform surface and a rather perfect spherical shape as compared to the support prepared by using conventional reaction initiator, iodine. In addition, the support prepared by the present invention has a bulk density equivalent to or higher than that of the support prepared by conventional methods as well as a uniform particle size distribution. Therefore, it is appropriately used for the preparation of a catalyst which can sufficiently meet the properties required in commercial olefin polymerization processes such as slurry polymerization, bulk polymerization, gas phase polymerization and the like.

What is claimed is:

1. A method for preparing a spherical support for olefin catalysts, which comprises reacting metal magnesium with an alcohol in the presence of a reaction initiator, characterized in that the reaction initiator is a halogenated nitrogen compound selected from the group consisting of the compounds represented by the following general formulas I-IV, wherein the halogenated nitrogen compound is used at the amount of 0.001-0.2 parts by weight, based on 1 part by weight of the metal magnesium, and the alcohol is used at the amount of 5-50 parts by weight, based on 1 part by weight of the metal magnesium:

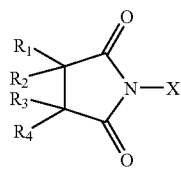

I wherein, X refers to halogen, and $R_1$, $R_2$, $R_3$ and $R_4$ are independently hydrogen, or alkyl or aryl having $C_{1-12}$;

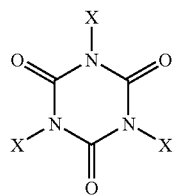

II wherein, X refers to halogen;

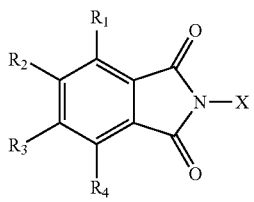

III wherein, x refers to halogen, and $R_1$, $R_2$, $R_3$ and $R_4$ are independently hydrogen, or alkyl or aryl having $C_{1-12}$;

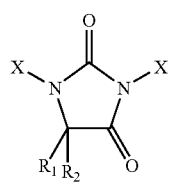

IV wherein, x refers to halogen, and $R_1$ and $R_2$ are independently hydrogen, or alkyl or aryl having $C_{1-12}$.

2. The method for preparing a spherical support for olefin polymerization catalysts according to claim 1, wherein the alcohol is at least one selected from the group consisting of aliphatic alcohols represented by the general formula ROH, wherein R is an alkyl having 1-6 carbon atoms, and aromatic alcohols.

* * * * *